United States Patent
Kaminsky

[11] 3,912,760
[45] Oct. 14, 1975

[54] PROCESS FOR THE PRODUCTION OF CHROMONE DERIVATIVES AND INTERMEDIATES PRODUCED THEREBY

[75] Inventor: Daniel Kaminsky, Parsippany, N.J.

[73] Assignee: Warner-Lambert Company, Morris Plains, N.J.

[22] Filed: Apr. 18, 1973

[21] Appl. No.: 352,133

[52] U.S. Cl........ 260/340.5; 260/345.5; 260/462 R; 424/282; 424/283; 424/298
[51] Int. Cl.[2]............... C07D 311/22; C07D 317/54
[58] Field of Search........... 260/340.5, 345.5, 462 R

[56] References Cited
OTHER PUBLICATIONS

Durden et al., J. Org. Chem., Vol. 30, (1965), pp. 1684–1687.
VanAllen et al., J. Het. Chem., 2 6: 29–35, (Feb., 1969).
Reynolds et al., J. Het. Chem., 6: 375–377, (June, 1969).

*Primary Examiner*—James A. Patten
*Attorney, Agent, or Firm*—Albert H. Graddis; Frank S. Chow; Anne M. Kelly

[57] ABSTRACT

This invention relates to a novel process for preparing chromone derivatives having the formula I:

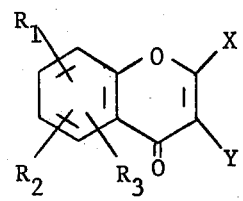

I wherein X represents hydrogen or lower alkyl; Y represents hydrogen, lower alkyl, or formyl, with at least one of X and Y being other than hydrogen; $R_1$ represents hydroxy, lower alkyl, or lower alkoxy; $R_2$ represents hydrogen, lower alkyl, or lower alkoxy; $R_3$ represents hydrogen, lower acyl, or lower acyloxy; and wherein $R_1$ and $R_2$ together may form a methylenedioxy ring, by reacting a substituted phenol II with an acid anhydride III and a boron trifluoride compound, preferably boron trifluoride etherate, to provide a substituted 2,2-difluoro-4-lower alkyl-1,3,2-benzodioxaborin intermediate IV and subjecting intermediate IV to treatment with a Vilsmeier reagent, such as phosphorus oxychloride together with dimethylformamide or phosphorus oxychloride together with dimethylacetamide, followed by hydrolysis. Certain of the final compounds I produced from the novel intermediates IV according to the process of this invention are useful as cardiovascular agents while others are useful in the treatment of allergic conditions and in the treatment of hyperacidity.

13 Claims, 1 Drawing Figure

PROCESS FOR THE PRODUCTION OF CHROMONE DERIVATIVES AND INTERMEDIATES PRODUCED THEREBY

SUMMARY OF THE INVENTION

This invention relates to a novel process for preparing compounds of the formula I:

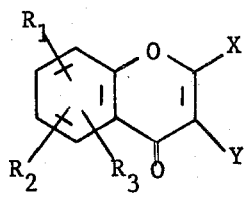

wherein X represents hydrogen or lower alkyl; Y represents hydrogen, lower alkyl, or formyl, with at least one of X and Y being other than hydrogen; $R_1$ represents hydroxy, lower alkyl, or lower alkoxy; $R_2$ represents hydrogen, lower alkyl, or lower alkoxy; $R_3$ represents hydrogen, lower acyl, or lower acyloxy; and wherein $R_1$ and $R_2$ together may form a methylenedioxy ring, which comprises treating a compound of the formula II:

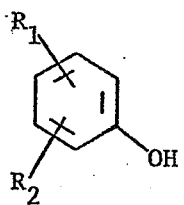

with an acid anhydride of the formula III:

$$(R_4CH_2CO)_2O \qquad III$$

and a boron trifluoride compound, preferably boron trifluoride etherate, to provide an intermediate of the formula IV:

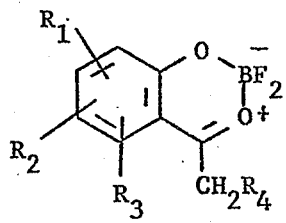

wherein $R_1$, $R_2$, and $R_3$ in formulas II, III and IV are as defined above and $R_4$ represents hydrogen or lower alkyl; and treating intermdiate IV with a Vilsmeier reagent selected from the group consisting of phosphorus oxychloride together with dimethylformamide, and phosphorus oxychloride together with dimethylacetamide, followed by hydrolysis. Novel intermediate compounds of the invention having formula IV are useful in the preparation of final compounds having the formula I, which in turn, have therapeutic activity.

BRIEF DESCRIPTION OF THE DRAWINGS

The novel process of the invention is illustrated schematically in FIG. 1.

DETAILED DESCRIPTION OF THE INVENTION

Figure 1:
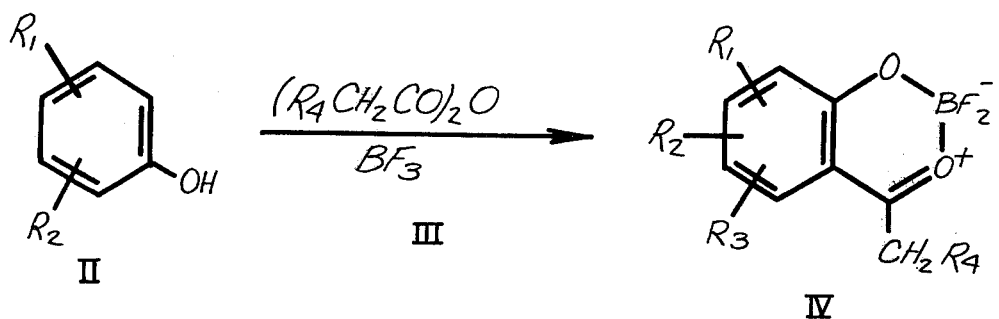
Figure 1:
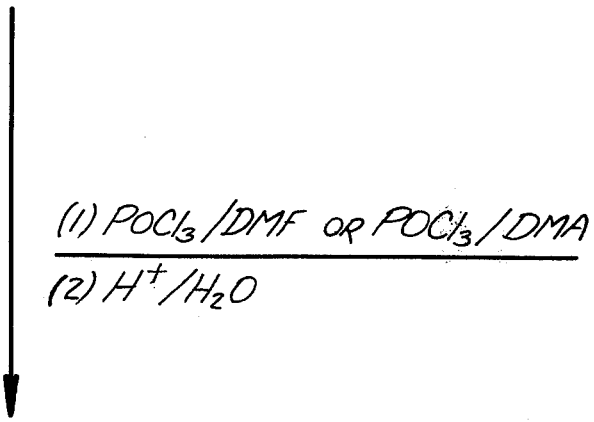
Figure 1:
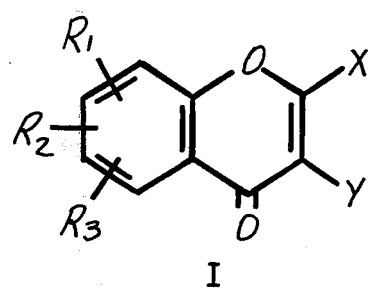

In FIG. I, the novel reaction of the instant invention and the novel intermediates and final products produced thereby are represented. A substituted phenol I is reacted with an acid anhydride II and a boron trifluoride compound to provide the novel substituted intermediate IV which is reacted with a Vilsmeir reagent, followed by hydrolysis, to provide final compounds I.

The Vilsmeier reagent may be either phosphorus oxychloride ($POCl_3$) with dimethylformamide (DMF) or phosphorus oxychloride ($POCl_3$) with dimethylacetamide (DMA). The substituents obtained on final compound I depend not only on the boron intermediate IV used, but also on the choice of DMF or DMA. For example, if $R_4$ in the boron intermediate IV is hydrogen (i.e., the substituent in the 4-position is methyl) and DMF is used, a final compound I is obtained wherein X is hydrogen and Y is formyl, as in Examples XIV - XXIV. With this same boron intermediate, when DMA is used a final compound I is obtained wherein X is methyl and Y is hydrogen, as in Example XXVII.

Surprisingly, when $R_4$ in the boron intermediate IV is methyl (i.e., the 4-substituent is ethyl) and DMF is used, a final compound I is obtained wherein X is hydrogen and Y is methyl, as in Example XXV. With this same boron intermediate, when DMA is used a final compound I is obtained wherein X is methyl and Y is methyl, as in Example XXVI.

The substituted phenol starting materials used in the novel process of this invention are readily available. The boron trifluoride compound is preferably boron trifluoride etherate. The intermediate boron complex IV is novel and useful in the preparation of final compounds I which are, in turn, pharmacologically active.

Novel intermediates having formula IV above form an especially preferred group when $R_1$ represents hydroxy, methyl, or methoxy; $R_2$ represents hydrogen, methyl, or methoxy; $R_3$ represents hydrogen, acetyl, or acetoxy; wherein $R_1$ and $R_2$ together may form a methylenedioxy ring; and wherein R, represents hydrogen or methyl.

Compounds of the formula I wherein X and Y each represent hydrogen or lower alkyl (but where X and Y are not both hydrogen) and where $R_1$, $R_2$ and $R_3$ are hydrogen, have cardiovascular activity.

Compounds of the formula I wherein X is hydrogen, Y is formyl, and $R_1$, $R_2$ and $R_3$ are as previously described for formula I, have anti-allergic and anti-secretory activity. Compounds within this group, which are pictured below in formula V, are more fully described in copending application Ser. No. 352,149, filed Apr. 18, 1973.

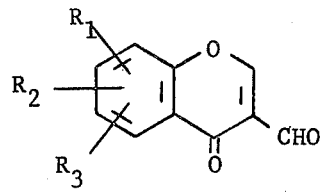

wherein $R_1$ represents hydroxy, lower alkyl, or lower alkoxy; $R_2$ represents hydrogen, or lower alkyl; and $R_3$ represents hydrogen, lower acyl or lower acyloxy and wherein $R_1$ and $R_2$ together may form a methylenedioxy ring. Substituted 3-formylchromones of formula V have been found to reduce histaminic responses to antigen challenge by inhibiting antibody-antigen reactions in mammals such as rats or guinea pigs upon oral or parenteral administration. When tested in accordance with the procedure of Mota, Life Sciences, 7, 465, (1963) and Ovary, Proc. Soc. Exptl. Biol. Med., 81, 584, (1952) therapeutic compositions containing these compounds are effective at dosages of 5 mg to 50 mg/kg of body weight.

Pharmaceutical compositions containing the compounds of formula V are therefore useful in the management of allergic reactions such as bronchial asthma. To treat bronchial asthma, a dose of 5 mg to 50 mg/kg by injection or by aerosol administration is suggested. The dosage may be varied depending upon severity of the condition and the weight, age and sex of the patient being treated.

In use, the compounds of formula V may be combined with a parenterally acceptable vehicle, such as a gum tragacanth saline suspension, to provide dosage forms suitable for parenteral administration; or they may be combined with pharmaceutical diluents such as lactonse, cornstarch, and the like formulated into tablet or capsule dosage forms. In order to enhance their therapeutic spectrum, the compounds of formula V may be combined with sympathomimetic agents such as isoprenaline or combined with steroids such as cortisone and its derivatives.

The compounds of formula V also exhibit antisecretory effects and are therefore useful in relieving gastric hyperacidity. Gastric hyperacidity has generally been described as a factor which contributes to peptic ulcer. The compounds of formula V, when administered to mammals in a manner as described below, have been found to inhibit the gastric secretion of hypochloric acid and are therefore effective in eliminating the resulting acidity in the stomach.

At a dosage of 20 mg/kg, administered intraperitoneally the subject compositions are effective in reducing gastric acidity in the pylorus ligated rate when tested according to the procedure of H. Shay, Gastroenterology, 5, 43, (1945).

Pharmaceutical compositions containing the compounds of formula V are thus indicated in the management of gastric hyperacidity and the treatment of peptic ulcer resulting from such hyperacidity. For parenteral administration, the pharmaceutical compositions containing the compounds of formula V may be administered as aqueous suspensions for intramuscular injection. These are prepared, for example, by suspending the active ingredient in sterile water and packaging in ampules so as to provide a concentration of 1,000 mg of the active ingredient per dosage unit.

Generally speaking, the dose required to effectively relieve gastric hyperacidity is within the range of 20 mg/kg of body weight of the mammal being treated. This dosage regimen may be varied depending upon the condition of the patient.

In addition to the above-mentioned utilities, the intermediates of this invention having formula IV are useful for the preparation of other therapeutically useful chromone derivatives, such as the corresponding carboxylic acids, esters, nitriles, oximes or acetals.

An alternate method for preparing the intermediates IV, described in part by Durden, J.A. et al., in J. Org. Chem. 30; 1684–1687 (1965), involves the reaction of 2-hydroxyacetophenone with acetic anhydride and boron trifluoride to provide 2,2-difluoro-4-methyl-1,3,2-benzodioxaborin. By subjecting this last mentioned compound to reaction with the Vilsmeir reagent, followed by hydrolysis, as taught by the novel process of this invention, 3-formylchromone is obtained.

In all of the above formulas I, II, III, IV and V, R group and X and Y definitions may be more fully described as follows: the term "lower alkyl" is meant to include lower aliphatic hydrocarbons having 1 to 4 carbon atoms in the carbon chain, such as methyl, ethyl, propyl, isopropyl, butyl, or isobutyl. This definition for lower alkyl also applies to the lower alkyl portion of "lower alkoxy".

The term lower alcyloxy is meant to include lower alkyl carboxylic acids wherein the lower alkyl moiety has the above described meaning. Similarly, the term lower acyl is meant to include acyl groups derived from such aforementioned lower alkyl carboxylic acids.

To further illustrate the practice of this invention, the following examples are included:

EXAMPLE I

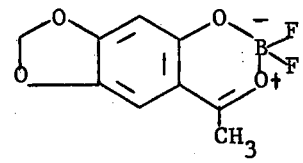

Method A — Preparation Of
2,2-Difluoro-4-methyl-1,3-dioxolo
[4,5-g]1,3,2-benzodioxaborin 100 g. (0.7 mole) of boron trifluoride etherate is added to a mixture of 70 g. (0.5 mole) of sesamol (3,4-methylenedioxyphenol) in 204 g. (2 moles) of acetic anhydride. When the exothermic reaction subsides, the mixture is heated for 2 hours on a steam bath. The cooled mixture is diluted with 200 ml. of 1:1 ethyl acetate:ether and filtered. The crude, after ether washing and drying, weighed 102.7 g. (89.5%); mp 194°–197°C. Recrystallization from ethyl acetate gave bright yellow crystals, mp 198°–200°C.

Anal. Calcd. for $C_9H_7BF_2O_4$: C, 47.42; H, 3.09; F, 16.67. Found: C, 47.43; H, 3.38; F, 16.50.

EXAMPLE II

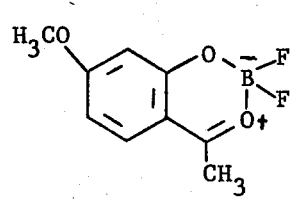

Preparation Of
2,2-Difluoro-7-methoxy-4-methyl-1,3,2-benzodioxaborin 2,2-Difluoro-7-methoxy-4-methyl-1,3,2-benzodioxaborin is prepared from boron trifluoride etherate and m-methoxyphenol, according to the procedure of Example I, to obtain a product having mp 173–174°C.

Anal. Calcd. for $C_9H_9BF_2O_3$: C, 50.52; H, 4.24; F 17.76. Found C, 50.69; H, 4.46; F, 17.87.

EXAMPLE III

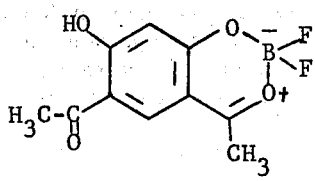

Preparation Of 6-Acetyl-2,2-difluoro-7-hydroxy-4-methyl-1,3,2-benzodioxaborin 6-Acetyl-2,2-difluoro-7-hydroxy-4-methyl-1,3,2-benzodioxaborin is prepared from boron trifluoride etherate and resorcinol, according to the procedure of Example I, to obtain a product having mp 197°–199°C. (dec).

Anal. Calcd. for $C_{10}H_9BF_2O_4$: C, 49.64; H, 3.75; F, 15.70. Found: C, 49.75; H, 3.70; F, 15.89.

EXAMPLE IV

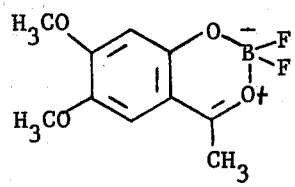

Preparation Of 2,2-Difluoro-4-methyl-6,7-dimethoxy-1,3,2-benzodioxaborin 2,2-Difluoro-4-methyl-6,7-dimethoxy-1,3,2-benzodioxaborin is prepared from boron trifluoride etherate and 3,4-dimethoxyphenol, according to the procedure of Example I, to obtain a product having mp 219-220°C.

Anal. Calcd. for $C_{10}H_{11}BF_2O_4$: C, 49.23; H, 4.54; F, 15.57. Found: C, 49.31; H, 4.75; F, 15.85.

EXAMPLE V

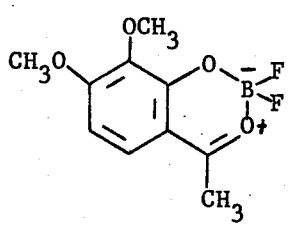

Preparation Of 2,2-Difluoro-7,8-dimethoxy-4-methyl-1,3,2-benzodioxaborin 2,2-Difluoro-7,8-dimethoxy-4-methyl-1,3,2-benzodioxaborin is prepared from boron trifluoride etherate and 2,3-dimethoxyphenol, according to the procedure of Example I, to obtain a product having mp 138°–140°C.

Anal. Calcd. for $C_{10}H_{11}BF_2O_4$: C, 49.23; H, 4.54; F, 15.57. Found: C, 49.27; H, 4.57; F, 15.75.

EXAMPLE VI

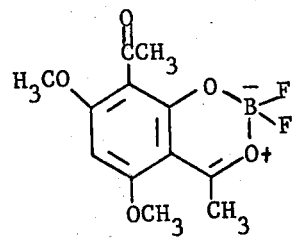

Preparation Of 8-Acetyl-2,2-difluoro-5,7-dimethoxy-4-methyl-1,3,2-benzodioxaborin 8-Acetyl-2,2-difluoro-5,7-dimethoxy-4-methyl-1,3,2-benzodioxaborin is prepared from boron trifluoride etherate and 3,5-dimethoxyphenol, according to the procedure of Example I, to obtain a product having mp 215°–217°C.

Anal. Calcd. for $C_{12}H_{13}BF_2O_5$: C, 50.39; H, 4.58; F, 13.28. Found: C, 50.36; H, 4.52; F, 13.59.

EXAMPLE VII

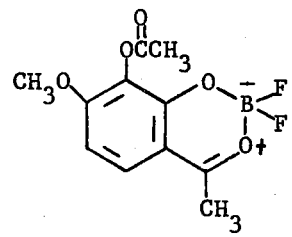

Preparation Of 8-Acetoxy-2,2-difluoro-7-methoxy-4-methyl-1,3,2-benzodioxaborin 8-Acetoxy-2,2-difluoro-7-methoxy-4-methyl-1,3,2-benzodioxaborin is prepared from boron trifluoride etherate and 3-methoxycatechol, according to the procedure of Example I, to obtain a product having mp 173°–175°C (dec).

Anal. Calcd. for $C_{11}H_{11}BF_2O_5$: C, 48.57; H, 4.08; 1 F, 13.97. Found: C, 48.47; H, 4.09; F, 14.16.

EXAMPLE VIII

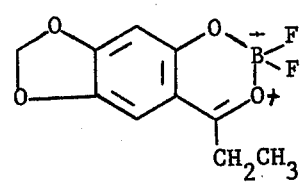

Preparation Of 2,2-Difluoro-4-ethyl-1,3-dioxolo[4,5-g]1,3,2-benzodioxaborin 2,2-Difluoro-4-ethyl-1,3-dioxolo[4,5-g]1,3,2-benzodioxaborin is prepared from boron trifluoride etherate and 3,4-methylenedioxyphenol (sesamol) according to the procedure of Example I, using proprionic anhydride (instead of acetic anhydride), to obtain a product having mp 162°–164°C.

Anal. Calcd. for $C_{10}H_9BF_2O_4$: C, 49.64; H, 3.75; F, 15.70. Found: C, 49.58; H, 3.79; F, 15.71.

EXAMPLE IX

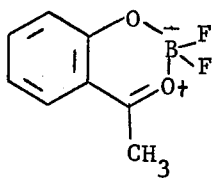

Method B — Preparation Of 2,2-Difluoro-4-methyl-1,3,2-benzodioxaborin

Boron trifluoride (170 g., 1.2 moles) is added to 82 g. (0.6 mole) of o-hydroxyacetophenone. The mixture becomes quite exothermic and is permitted to react for several hours. The cooled mixture is filtered, washed with ether and dried to yield 93 g. (84.5%) of yellow crystalline solid; mp 139°–141°C. [Reported in J. Org. Chem 30: 1684-1687 (1965) mp 142.5°–145°C.].

EXAMPLE X

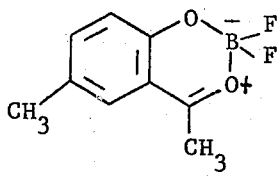

Preparation Of 2,2-Difluoro-4,6-dimethyl-1,3,2-benzodioxaborin 2,2-Difluoro-4,6-dimethyl-1,3,2-benzodioxaborin is prepared from boron trifluoride and 2'-hydroxy-5'-methyl-acetophenone according to the procedure of Example IX, to obtain a product having mp 148°–150°C.

Anal. Calcd. for $C_9H_9BF_2O_2$: C, 54.60; H, 4.58; F, 19.19. Found: C, 54.21; H, 4.49; F, 18.49.

EXAMPLE XI

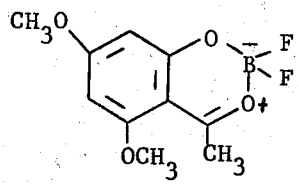

Preparation Of 2,2-Difluoro-5,7-dimethoxy-4-methyl-1,3,2-benzodioxaborin 2,2-Difluoro-5,7-dimethoxy-4-methyl-1,3,2-benzodioxaborin is prepared from boron trifluoride and 2'-hydroxy-4',6'-dimethoxyacetophenone according to the procedure of Example IX, using ethyl acetate and Skelly solve C (instead of ether), to obtain a product having mp 154°–155°C.

Anal. Calcd. for $C_{10}H_{11}BF_2O_4$: C, 49.23; H, 4.54; F, 15.57. Found: C, 49.20; H, 4.57; F, 15.45.

EXAMPLE XII

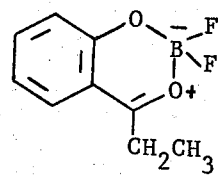

Preparation Of 2,2-Difluoro-4-ethyl-1,3,2-benzodioxaborin 2,2-Difluoro-4-ethyl-1,3,2-benzodioxaborin is prepared from boron trifluoride and o-hydroxypropiophenone according to the procedure of Example IX, to obtain a product having mp 116°–118°C.

Anal. Calcd. for $C_9H_9BF_2O_2$: C, 54.60; H, 4.58; F, 19.19. Found: C, 54.40; H, 4.63; F, 19.24.

EXAMPLE XIII

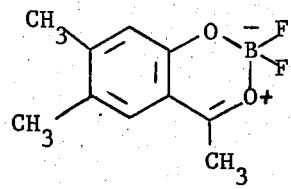

Preparation Of 2,2-Difluoro-4,6,7-trimethyl-1,3,2-benzodioxaborin 2,2-Difluoro-4,6,7-trimethyl-1,3,2-benzodioxaborin is prepared from boron trifluoride and 2-hydroxy-4,5-dimethylacetophenone according to the procedure of Example IX, to obtain a product having mp 189°–192°C.

EXAMPLE XIV

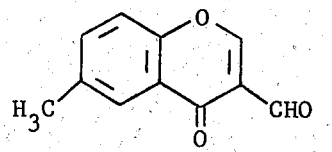

Method C — General Procedure And Preparation Of 3-formyl-6-methylchromone

A solution of Vilsmeier Reagent is prepared by the dropwise addition of 153 g. (1.0 mole) of phosphorus oxychloride to ice cold dimethylformamide (365 g., 5 moles). The temperature is maintained below 10°C by use of a cooling bath. One-half mole of the appropriate boron fluoride complex is added and the mixture stirred for 15 minutes, then heated on a steam bath for 2 hours. The reaction mixture is poured onto about 3 liters of cold water. After standing at room temperature for several hours, the mixture is filtered to yield the desired substituted-3-formyl chromone derivative. Using this procedure, the following compounds are prepared: 3-formyl-6-methylchromone is prepared from 2,2-difluoro-4,6-dimethyl-1,3,2-benzodioxaborin, according to procedure C, to obtain a product having mp 171°–173°C.

Anal. Calcd. for $C_{11}H_8O_3$: C, 70.21; H, 4.29. Found: C, 69.95; H, 4.33.

EXAMPLE XV

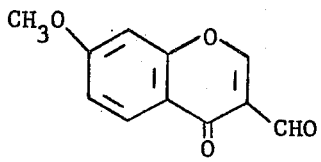

Preparation Of 7-Methoxy-3-formylchromone

7-Methoxy-3-formylchromone is prepared from 2,2-difluoro-7-methoxy-4-methyl-1,3,2-benzodioxaborin, according to procedure C of Example XIV, to obtain a product having mp 188°–190°C.

Anal. Calcd. for $C_{11}H_8O_4$: C, 64.70; H, 3.95. Found: C, 64.47 H, 4.09.

EXAMPLE XVI

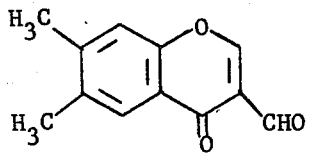

Preparation Of 3-Formyl-6,7-dimethylchromone

3-Formyl-6,7-dimethylchromone is prepared from 2,2-difluoro4,6,7-trimethyl-1,3,2-benzodioxaborin, according to procedure C in Example XIV, to obtain a product having mp 154°–156°C.

Anal. Calcd. for $C_{12}H_{10}O_3$: C, 71.28; H, 4.99. Found: C, 71.11; H, 4.92.

EXAMPLE XVII

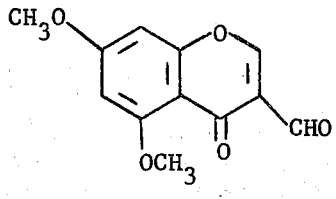

Preparation Of 3-Formyl-5,7-dimethoxychromone

3-Formyl-5,7-dimethoxychromone is prepared from 2,2-difluoro-5,7-dimethoxy-4-methyl-1,3,2-benzodioxaborin, according to procedure C of Example XIV.

EXAMPLE XVIII

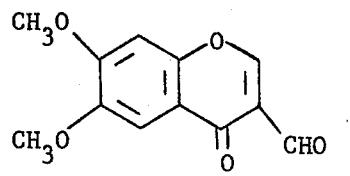

Preparation Of 3-Formyl-6,7-dimethoxychromone

3-Formyl-6,7-dimethoxychromone is prepared from 2,2-difluoro-4-methyl-6,7-dimethoxy-1,3,2-benzodioxaborin, according to procedure C of Example XIV, to obtain a product having mp 222°–223°C.

Anal. Calcd. for $C_{12}H_{10}O_5$: C, 61.54; H, 4.30. Found: C, 61.54; C, 4.28.

EXAMPLE XIX

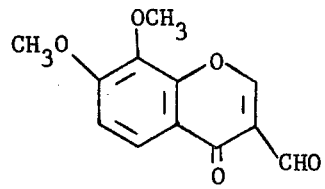

Preparation Of 7,8-Dimethoxy-3-formylchromone 7,8-Dimethoxy-3-formylchromone is prepared from 2,2-difluoro-7,8-dimethoxy-4-methyl-1,3,2-benzodioxaborin, according to procedure C of Example XIV, to obtain a product having mp 181°–182°C.

Anal. Calcd. for $C_{12}H_{10}O_5$: C, 61.54; H, 4.30. Found: C, 61.44; H, 4.16.

EXAMPLE XX

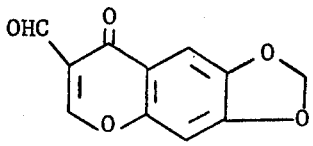

Preparation Of 3-Formyl-6,7-methylenedioxychromone

3-Formyl-6,7-methylenedioxychromone is prepared from 2,2-difluoro-4-methyl-1,3-dioxolo[4,5-g]1,3,2-benzodioxaborin, according to procedure C of Example XIV, to obtain a product having mp 232°–233°C.

Anal. Calcd. for $C_{11}H_6O_5$: C, 60.56; H, 2.77. Found: C, 60.80; H, 2.79.

EXAMPLE XXI

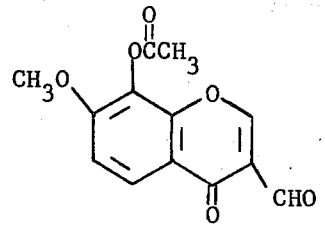

Preparation Of 8-Acetoxy-3-formyl-7-methoxychromone

8-Acetoxy-3-formyl-7-methoxychromone is prepared from 8-acetoxy-2,2-difluoro-7-methoxy-4- methyl-1,3,2-benzodioxaborin, according to procedure C of Example XIV, to obtain a product having mp 160°–161°C.

Anal. Calcd. for $C_{13}H_{10}O_6$: C, 59.54; H, 3.84. Found: C, 59.42; H, 3.80.

EXAMPLE XXII

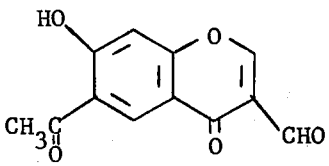

Preparation Of 6-Acetyl-3-formyl-7-hydroxychromone

6-Acetyl-3-formyl-7-hydroxychromone is prepared from 6-acetyl-2,2-difluoro-7-hydroxy-4-methyl-1,3,2-benzodioxaborin, according to procedure C of Example XIV.

EXAMPLE XXIII

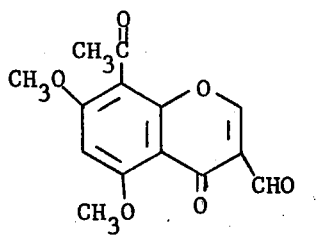

Preparation Of 8-Acetyl-3-formyl-5,7-dimethoxychromone

8-Acetyl-3-formyl-5,7-dimethoxychromone is prepared from 8-acetyl2,2-difluoro-5,7-dimethoxy-4-methyl-1,3,2-benzodioxaborin, according to procedure C of Example XIV.

EXAMPLE XXIV

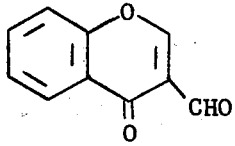

Preparation Of 3-Formylchromone

3-Formylchromone is prepared from 2,2-dilfuoro-4-methyl-1,3,2-benzodioxaborin, according to procedure C of Example XIV to obtain a product having mp 149°–151°C.

Anal. Calcd. for $C_{10}H_6O_3$: C, 68.96; H, 3.47. Found: C, 69.20; H, 3.69.

[Compound prepared by another method, reported in Eiden, F. et al., Arch. der Pharm. 300: 806–810 (1967)]

EXAMPLE XXV

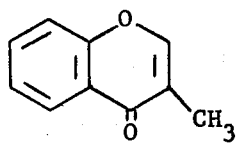

Preparation Of 3-Methylchromone

A solution of Vilsmeier Reagent is prepared by slow addition of 46 g. (0.3 mole) of phosphorus oxychloride to 110 g. (about 1.5 moles) of cold dimethyl formamide, while maintaining temperature below 10°C. After stirring for an additional 15 minutes, 30 g. (0.15 mole) of 2,2-difluoro-4-ethyl-1,3,2-benzodioxaborin is added and then heated for 2 hours on a steam bath. The mixture is poured into 2 liters of warm water. After several hours it is extracted with 3 × 250 ml. of chloroform. The combined chloroform extract is filtered through florisil, freed of solvent and the residue recrystallized several times from high boiling petroleum ether to yield 4.6 g. (19%) of almost colorless crystals of 3-methylchromone; mp 70°–71°C.

Anal. Calcd. for $C_{10}H_8O_2$: C, 74.99; H, 5.03. Found: C, 74.87; H, 5.11.

EXAMPLE XXVI

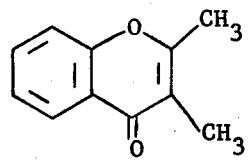

Preparation Of 2,3-Dimethylchromone

To 26.1 g. (0.3 mole) of dimethylacetamide (cooled to about 0°C) is added dropwise, 23 g. (0.15 mole) of phosphorus oxychloride, with temperature maintained below 5°C during addition. The solution is permitted to warm to room temperature and 19.8 g (0.1 mole) of 2,2-difluoro-4-ethyl-1,3,2-benzodioxaborin is added. The mixture is stirred for one hour and then heated for three hours on a steam bath. The mixture is poured into 2 liters of ice water. After standing overnight, the precipitated oil is separated and refluxed for two hours with 500 ml. 5% hydrochloric acid. The cooled solution is extracted with methylene chloride. The combined methylene chloride extracts are freed of solvent and the residue recrystallized several times from Skellysolve B to yield 1t. yellow crystalline product (20%); mp 93°–95°C.

Anal. Calcd for $C_{11}H_{10}O_2$: C, 75.84; H, 5.79. Found: C, 75.82; H, 5.96.

[Reported mp 96°–97°C, *J. Ind. Chem. Soc.*, 39, 507 (1962)].

EXAMPLE XXVII

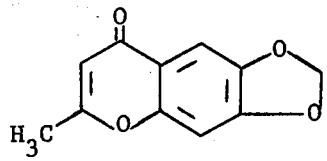

Preparation of 6-Methyl-8H-1,3-dioxolo[4,5-g][1]benzopyran-8-one

6-Methyl-8H-1,3-dioxolo[4,5-g][1]benzopyran-8-one is prepared from 2,2-difluoro-4-methyl-1,3-dioxo[4,5-g]-1,3,2-benzodioxaborin according to the procedure of Example XXVI, to obtain a product having mp 177°–178°C. (dec).

Anal. Calcd. for $O_4C_{11}H_8$: C, 64.70; H, 3.95. Found: C, 64.68; H, 4.05.

I claim:

1. A process for the preparation of a compound of the formula I:

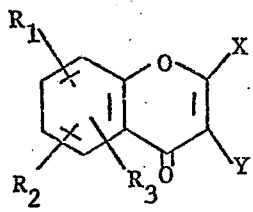

wherein X represents hydrogen or lower alkyl; Y represents hydrogen, lower alkyl, or formyl, with at least one of X and Y being other than hydrogen, $R_1$ represents hydroxy, lower alkyl, or lower alkoxy; $R_2$ represents hydrogen, lower alkyl, or lower alkoxy; $R_3$ represents hydrogen, lower alkanoyl, or lower alkanoyloxy; and wherein $R_1$ and $R_2$, when attached to adjacent carbon atoms, together may form a methylenedioxy ring, which comprises treating a compound of the formula II:

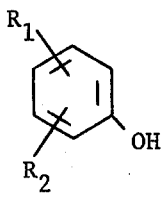

with an acid anhydride of the formula III:

$$(R_4CH_2CO)_2O \quad\quad III$$

and a boron trifluoride compound to provide an intermediate of the formula IV:

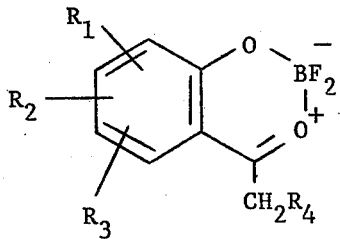

wherein $R_1$, $R_2$, and $R_3$ in formulas II, III and IV are as defined above and $R_4$ represents hydrogen or lower alkyl; and treating intermediate IV with a Vilsmeier reagent selected from the group consisting of phosphorus oxychloride together with dimethylformamide, and phosphorus oxychloride together with dimethylacetamide, followed by hydrolysis.

2. A compound of the formula IV:

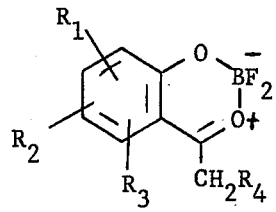

wherein $R_1$ represents hydroxy, or lower alkoxy; $R_2$ represents hydrogen, lower alkyl, or lower alkoxy; $R_3$ represents hydrogen, lower alkanoyl, or lower alkanoyloxy; and $R_1$ and $R_2$, when attached to adjacent carbon atoms, together may form a methylenedioxy ring; and $R_4$ represents hydrogen or lower alkyl.

3. A compound according to claim 2 wherein $R_1$ represents hydroxy, or methoxy; $R_2$ represents hydrogen, methyl, or methoxy; $R_3$ represents hydrogen, acetyl, or acetoxy; and $R_1$ and $R_2$, when attached to adjacent carbon atoms, together may form a methylenedioxy ring; and $R_4$ represents hydrogen or methyl.

4. A compound according to claim 3 which is 2,2-difluoro-4-methyl-1,3-dioxolo[4,5-g]1,3,2-benzodioxaborin.

5. A compound according to claim 3 which is 2,2-difluoro-7-methoxy-4-methyl-1,3,2-benzodioxaborin.

6. A compound according to claim 3 which is 6-acetyl-2,2-difluoro-7-hydroxy-4-methyl-1,3,2-benzodioxaborin.

7. A compound according to claim 3 which is 2,2-difluoro-4-methyl-6,7-dimethoxy-1,3,2-benzodioxaborin.

8. A compound according to claim 3 which is 2,2-difluoro-7,8-dimethoxy-4-methyl-1,3,2-benzodioxaborin.

9. A compound according to claim 3 which is 8-acetyl-2,2-difluoro-5,7-dimethoxy-4-methyl-1,3,2-dioxaborin.

10. A compound according to claim 3 which is 8-acetoxy-2,2-difluoro-7-methoxy-4-methyl-1,3,2-benzodioxaborin.

11. A compound according to claim 3 which is 2,2-difluoro-4-ethyl-1,3-dioxolo[4,5-g]-1,3,2-benzodioxaborin.

12. A compound according to claim 3 which is 2,2-difluoro-5,7-dimethoxy-4-methyl-1,3,2-benzodioxaborin.

13. 2,2-Difluoro-4,6,7-trimethyl-1,3,2-benzodioxaborin.

* * * * *